(12) United States Patent
Kosuge et al.

(10) Patent No.: US 9,422,008 B2
(45) Date of Patent: Aug. 23, 2016

(54) FRONT COVER ASSEMBLY OF UTILITY VEHICLE

(71) Applicant: KAWASAKI JUKOGYO KABUSHIKI KAISHA, Hyogo (JP)

(72) Inventors: Hideyoshi Kosuge, Kobe (JP); Chad Enger, Lincoln, NE (US)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 0 days.

(21) Appl. No.: 14/570,149

(22) Filed: Dec. 15, 2014

(65) Prior Publication Data

US 2016/0167715 A1 Jun. 16, 2016

(51) Int. Cl.
*B62D 25/00* (2006.01)
*B62D 25/12* (2006.01)
*B60R 19/52* (2006.01)

(52) U.S. Cl.
CPC ............... *B62D 25/12* (2013.01); *B60R 19/52* (2013.01); *B60R 2019/525* (2013.01)

(58) Field of Classification Search
CPC .... B60Q 1/0035; B60Q 1/0433; B62D 25/12; B60R 19/52
USPC ................................ 296/181.1, 193.09, 1.08
See application file for complete search history.

(56) References Cited

U.S. PATENT DOCUMENTS

| | | | | |
|---|---|---|---|---|
| 5,743,588 | A * | 4/1998 | Ufrecht | B60J 5/0444 296/146.6 |
| 7,134,702 | B2 * | 11/2006 | Takahashi | B60Q 1/0433 224/401 |
| 7,614,685 | B2 * | 11/2009 | Oka | B60J 5/0437 180/274 |
| 8,152,219 | B2 * | 4/2012 | Suzuki | B60J 5/0468 296/146.5 |
| 8,418,408 | B2 * | 4/2013 | Yasuhara | B60J 5/0426 296/146.6 |
| 8,727,420 | B2 * | 5/2014 | Yasuhara | B60J 5/0426 296/146.5 |
| 8,827,357 | B2 | 9/2014 | Kaku et al. | |
| 2007/0216180 | A1 * | 9/2007 | Hanson | B60Q 1/0035 296/1.08 |
| 2008/0289896 | A1 * | 11/2008 | Kosuge | B60K 11/06 180/312 |
| 2012/0161427 | A1 * | 6/2012 | Tsumiyama | B60J 5/0487 280/781 |
| 2014/0375078 | A1 * | 12/2014 | Fujihara | B60J 5/0443 296/146.6 |

* cited by examiner

*Primary Examiner* — Pinel Romain
(74) *Attorney, Agent, or Firm* — Wenderoth, Lind & Ponack, L.L.P.

(57) ABSTRACT

A front cover assembly of a utility vehicle including a riding space surrounded with a R. O. P. S. (rollover protective structure) and a cargo bed. The front cover assembly includes a left side front fender, right side front fender, a front grille, and a hood covering the top of a front chamber. These members are provided separately from one another. The hood is configured to be detached from other members or be opened and closed independently.

7 Claims, 12 Drawing Sheets

FRONT COVER ASSEMBLY OF UTILITY VEHICLE

BACKGROUND OF THE INVENTION

1. Field of the Invention

The present invention relates to a front cover assembly of a utility vehicle.

2. Description of the Related Art

A utility vehicle includes a chassis frame, right and left front wheels, right and left rear wheels, a riding space (cabin) surrounded with an R. O. P. S. (rollover protective structure), an engine, a cargo bed or carrier located behind the riding space, and a front cover assembly located ahead of the riding space. The engine is typically located below a seat in the riding space or below the cargo bed. U.S. Pat. No. 8,827,357 is cited as a prior art literature of such a utility vehicle.

The front cover assembly includes a left side front fender covering a top of the left front wheel, a right side front fender covering a top of the right front wheel, a front grille or a bumper covering a front of a front chamber, and a hood or bonnet covering a center of the front chamber.

In a conventional front cover assembly, a left side front fender, a right side front fender, and a front grille connecting front ends of these front fenders are molded integrally.

In a case where the left side front fender, the right side front fender, and the front grille are provided integrally, such an integral member having a large U shape when viewed from above. Therefore, it requires a complex resin molding tool or dies to mold resin and obtain the integral member, and the cost for the tool or die is high. It is also difficult to increase rigidity of the integral member in such a complex shape.

SUMMARY OF THE INVENTION

An object of the present invention is to simplify a molding tool or die for a component member of a front cover assembly and facilitate manufacture or production of the front cover assembly. Another object is to facilitate the operations of opening, closing, or detaching a hood.

In order to achieve the object, the present invention provides a front cover assembly of a utility vehicle. The front cover assembly comprises a left side front fender; a right side front fender provided separately from the left side front fender; a front grille provided separately from the left side front fender and the right side front fender, the front grille connecting a front end of the left side front fender and a front end of the right side front fender; and a hood provided separately from the left side front fender, the right side front fender, and the front grille. The hood is located between the left side front fender and the right side front fender, and the hood is detachable, or openable independently.

With the present invention, the three members, namely, the left side front fender, the right side front fender, and the hood are manufactured separately from one another. Accordingly, molding tools or dies for these members can be simplified and manufacture or production can be facilitated. Furthermore, since the hood can be opened, closed, or detached independently, the task work of opening, closing, or detaching the hood is facilitated due to reduction of the three members in size and weight.

The front cover assembly of the utility vehicle can preferably have the following configurations.

(a) A rear end of the left side front fender and a rear end of the right side front fender are connected by a connecting member. This configuration improves rigidity of the left side and the right side front fenders.

(b) In the above configuration (a), the connecting member is provided as a cover member covering a front of an interior of a dashpanel or dashboard provided at a front end of a riding space. This configuration reduces the number of components in the front cover assembly.

(c) In the above configuration (a), the connecting member has a left end covering a rear of a left wheel housing and a right end covering a rear of a right wheel housing. This configuration enables the connecting member to effectively serve as a wall covering the rears of the right and left wheel housings.

(d) The front grille has an eaves portion covering a top of a radiator provided in a front chamber covered with the hood, and the eaves portion has an opening at a position corresponding to a liquid inlet cap of the radiator. In this configuration, the top of the radiator can be protected and liquid can be supplied into the radiator easily.

(e) The front grille has right and left ends each provided with a headlight attachment portion. This configuration improves attachability of the headlight assembly.

(f) In the above configuration (a), the front cover assembly further includes: a first fixing mechanism configured to fix a front end of the hood to the front grille; and a second fixing mechanism configured to fix a rear end of the hood to the connecting member. One of the first fixing mechanism and the second fixing mechanism includes a concave portion and a projection configured to be inserted to the concave portion, and another one of the first fixing mechanism and the second fixing mechanism includes a latch configured to be locked and unlocked manually. This configuration facilitates the task of detaching the hood and the checking task in the front chamber.

DETAILED DESCRIPTION OF THE PREFERRED EMBODIMENTS

Figure 1:
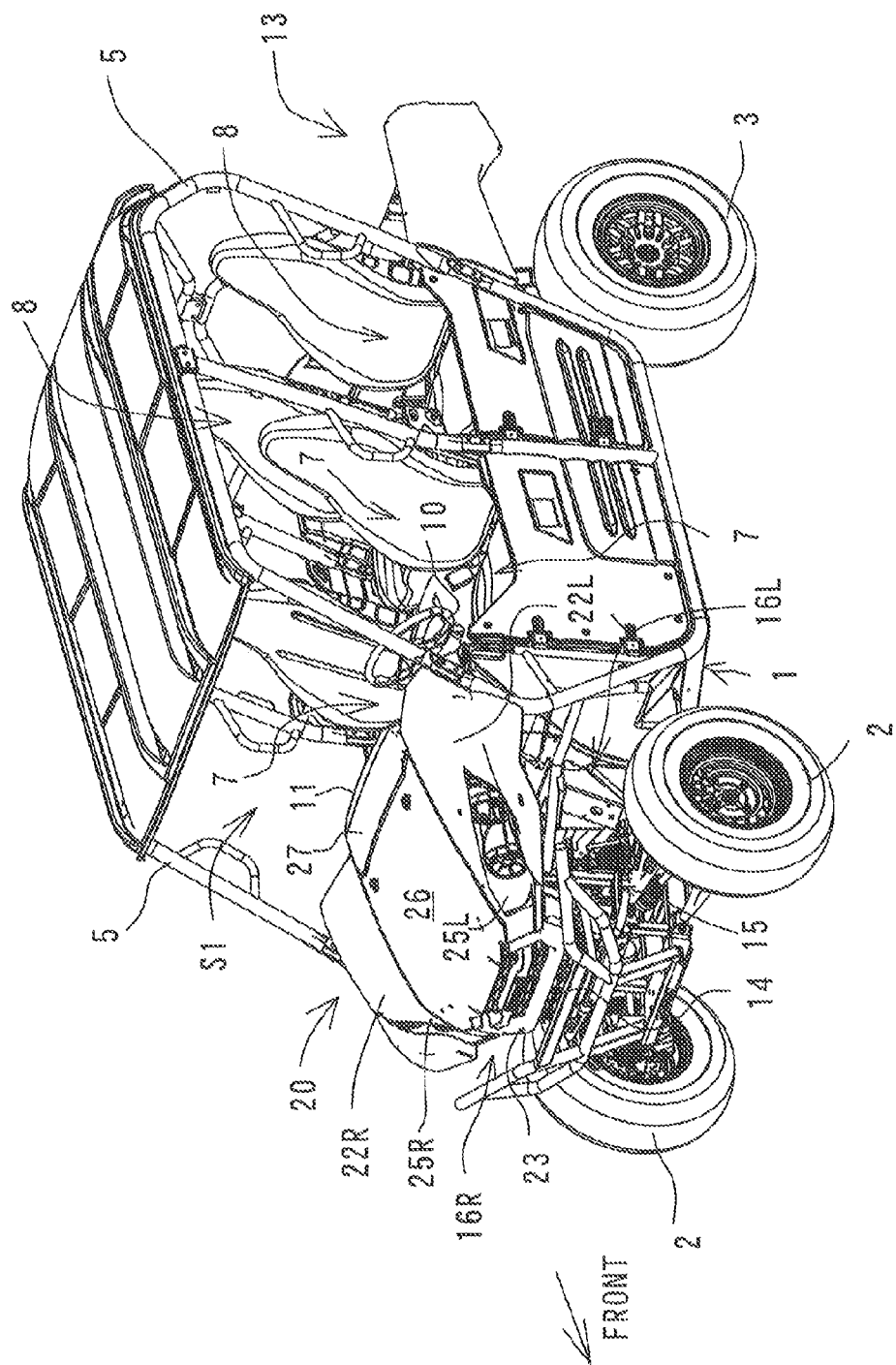
FIG. 1 is a schematic perspective view of a utility vehicle including a front cover assembly according to the present invention.

FIGS. 1 to 13 each show a utility vehicle including a front cover assembly according to the present invention. A preferred embodiment of the present invention will now be described with reference to these drawings. For convenience of description in this embodiment, a forward travelling direction of the vehicle is called "front" of the vehicle and each of components of the vehicle, and a right and left direction as seen from a driver or passenger is called "a right and left direction" of the vehicle and each of the components of the vehicle, As shown in FIG. 1, the utility vehicle includes a chassis frame 1, right and left front wheels 2 located at a front end of the chassis frame 1, and right and left rear wheels 3 located at a rear end of the chassis frame 1. A riding space (cabin) S1 is located between the front wheels 2 and the rear wheels 3 in a front and rear direction, and is surrounded with a R. O. P. S. 5. The riding space S1 accommodates right and left front seats 7 and right and left rear seats 8. A steering wheel 10 and a dashpanel 11 are provided at a front end of the riding space S1, and an engine (not shown) is located below the front seats 7. The R. O. P. S. is an abbreviation for a rollover protective structure.

The utility vehicle further includes a cargo bed or carrier 13 located behind the riding space S1, and a front cover assembly 20 located ahead of the riding space S1. The front cover assembly 20 covers a front chamber 15 as well as right and left wheel housings 16R and 16L. The front chamber 15 accommodates a radiator 14 for an engine coolant. The radiator 14 is located at a front end of the front chamber 15.

Figure 2:
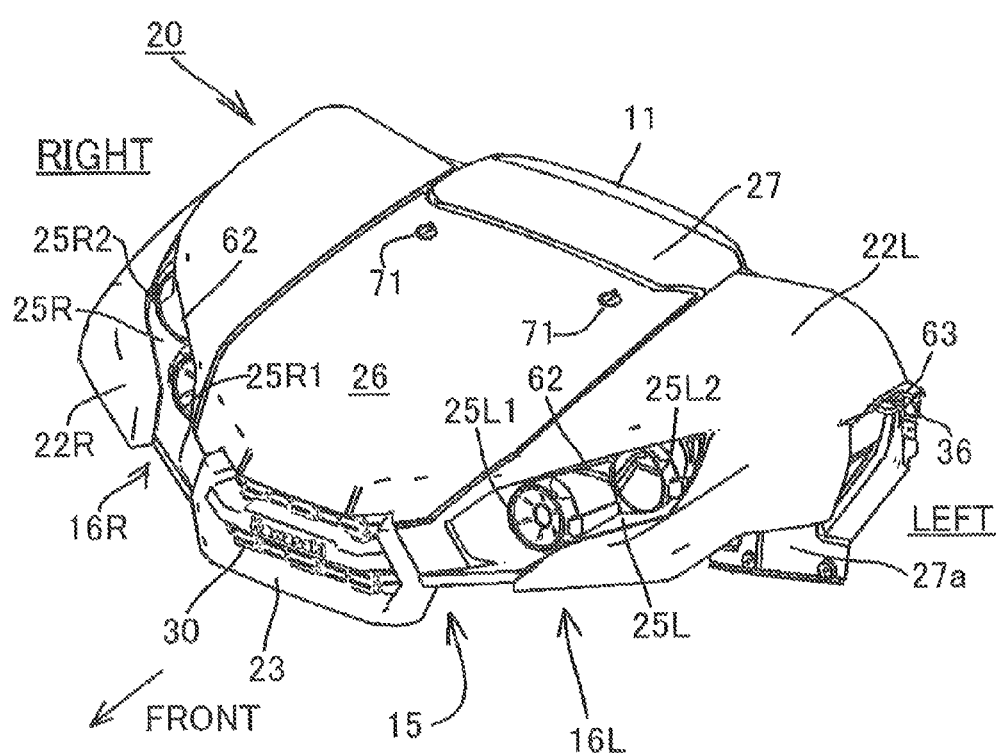
FIG. 2 is a perspective view viewed from above on the front left, of the front cover assembly shown in FIG. 1.

As shown in FIG. 2, the front cover assembly 20 includes a left side front fender 22L covering a top of the left wheel housing 16L, a right side front fender 22R covering a top of the right wheel housing 16R, a front grille 23 covering a front of the front chamber 15, a hood 26 located between the right side and the left side front fenders 22R and 22L, and a dashpanel cover 27 covering a rear of the front chamber 15. The hood 26 covers a top of the front chamber 15. The dashpanel cover 27 is attached to a front surface of the dashpanel 11 and is connected to rear ends of the right side and the left side front fenders 22R and 22L.

The five cover members configuring the front cover assembly 20, namely, the left side front fender 22L, the right side front fender 22R, the front grille 23, the hood 26, and the dashpanel cover 27 are provided separately from one another and are each made of resin by molding in a molding tool or the having the shape of the corresponding member.

The front grille 23 has a lattice shape with a large number of air inlets 30. A left headlight attachment portion 25L is provided integrally to the front grille 23 and extends leftward and backward from the left end of the front grille 23. A right headlight attachment portion 25R is provided integrally to the front grille 23 and extends rightward and backward from the right end of the front grille 23. The left headlight attachment portion 25L has two left lamp attachment holes 25L1 and 25L2, whereas the right headlight attachment portion 25R has two right lamp attachment holes 25R1 and 25R2. All of the four lamp attachment holes 25L1, 25L2, 25R1, and 25R2 are opened when the lamps are attached to the lamp attachment holes 25L1, 25L2, 25R1, and 25R2. When lamps are attached only to the two lamp attachment holes 25L2 and 25R2, the remaining two lamp attachment holes 25L1 and 25R1 are each closed by a lid member.

The hood 26 is located in a substantially rectangular area surrounded with the right side and the left side front fenders 22R and 22L, the front grille 23, and the dashpanel cover 27. The hood 20 can be independently detached from the other members of the front cover assembly 20.

Figure 3:
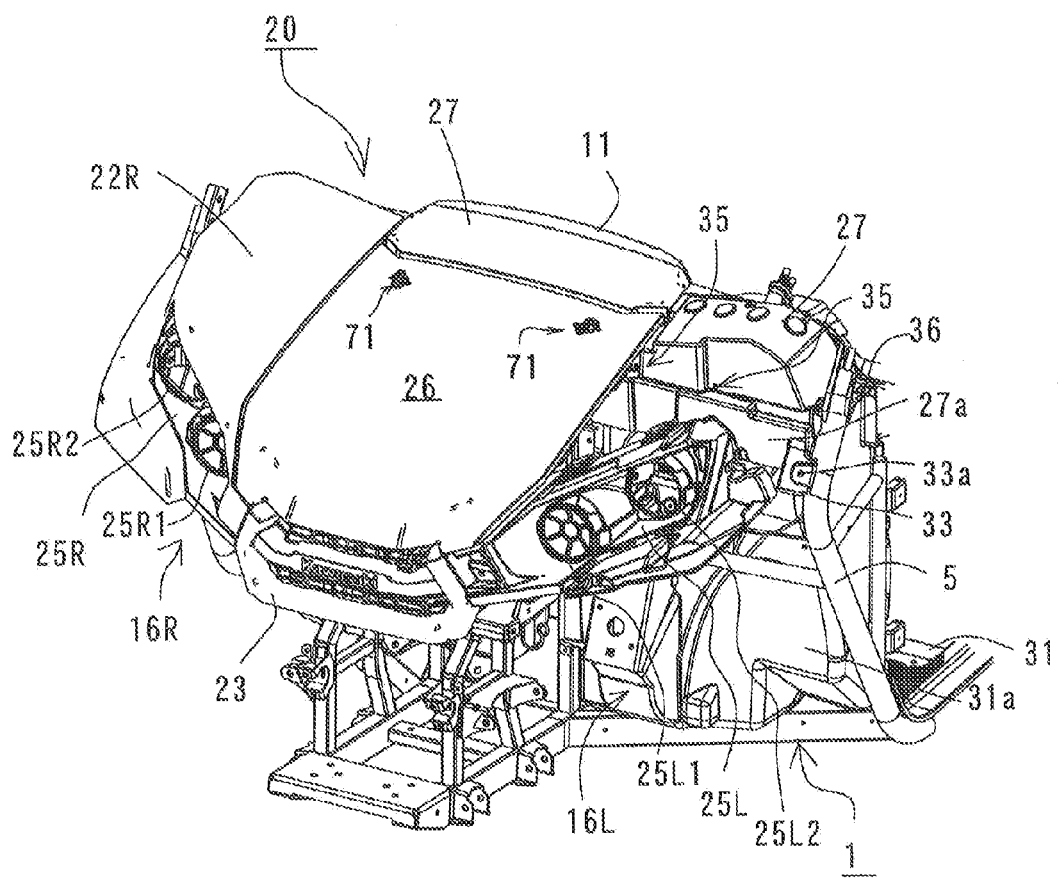
FIG. 3 is a perspective view viewed from above on the front left, of a front portion of the utility vehicle shown in FIG. 1 in a state where a left side front fender is detached.

As shown in FIG. 3, the dashpanel cover 27 is integrally provided with an extending portion 27a that extends downward. The extending portion 27a covers rear tops of the right and left wheel housings 16R and 16L. That is, the extending portion 27a also serves as part of the front fender. A floor plate 31 is integrally provided with a rising portion 31a at the front end thereof. The rising portion 31a also covers the rears of the wheel housings 16R and 16L.

Figure 4:
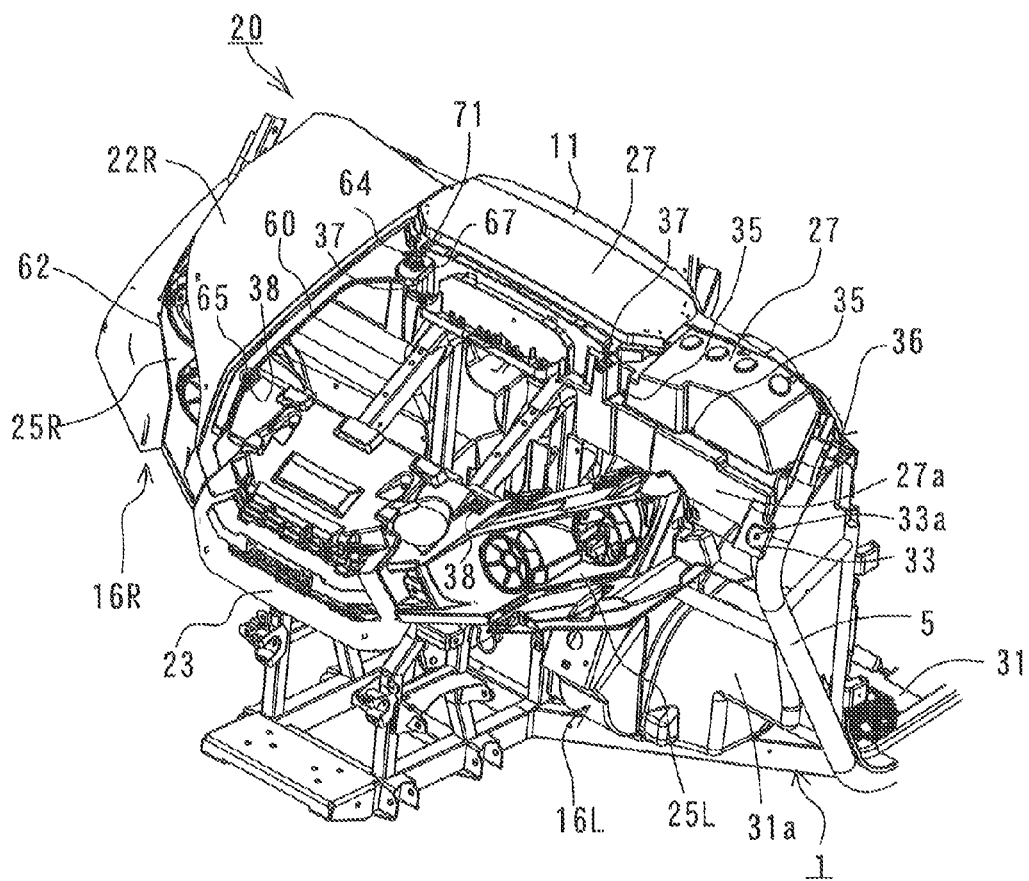
FIG. 4 is a perspective view viewed from above the front left, of the front portion of the utility vehicle shown in FIG. 1 in a state where the left side front fender and a hood are detached.

How the dashpanel cover 27 is fixed is described in detail below. As shown in FIG. 4, in order to fix the dash panel cover 27, the extending portion 27a is integrally provided with first cover attached (attachment) portions 33 at both ends of the extending portion 27a in the vehicle width direction. The first cover attached portions 33 have attached holes 33a respectively. The first attached portions 33 are each fixed to the R. O. P. S. 5 by a fastener member. As for the fastener member, a rivet, a bolt-nut, a tapping screw, or the like are used. According to the present embodiment, a push rivet is provided as a fastener member. The push rivet receives a pin slidable into a rivet body. The pin pushed into the rivet body expands a distal end of the rivet, and an expanded portion and a head of the rivet fasten the two members.

As well as the two first cover attached portions 33, the dashpanel cover 27 is provided with four second cover attached portions 35 each having an attached hole. The four second cover attached portions 35 are formed on a front wall of the dashpanel at intervals in the vehicle width direction. The two second attached portions 35 located on a left side are shown in FIG. 4, but the other two second attached portions 35 located on the right side are hidden behind the right side front fender 25R and are not shown in FIG. 4.

The dashpanel cover 27 is provided with two first fender attaching seats 36 on right and left end walls of the dashpanel cover 27 so that rear ends of the right side and left side front fenders 22R and 22L are fixed firmly to the first fender attaching seats 36 at outer ends of the front fenders 22R and 22L in the vehicle width direction. The dashpanel cover 27 is also provided with two second fender attaching seats 37 on a front wall of the dashpanel cover 27 so that the right side and the left side front fenders 22R and 22L are fixed firmly to the second fender attaching seats 37 at inner ends of the front fenders 22R and 22L.

Figure 6:
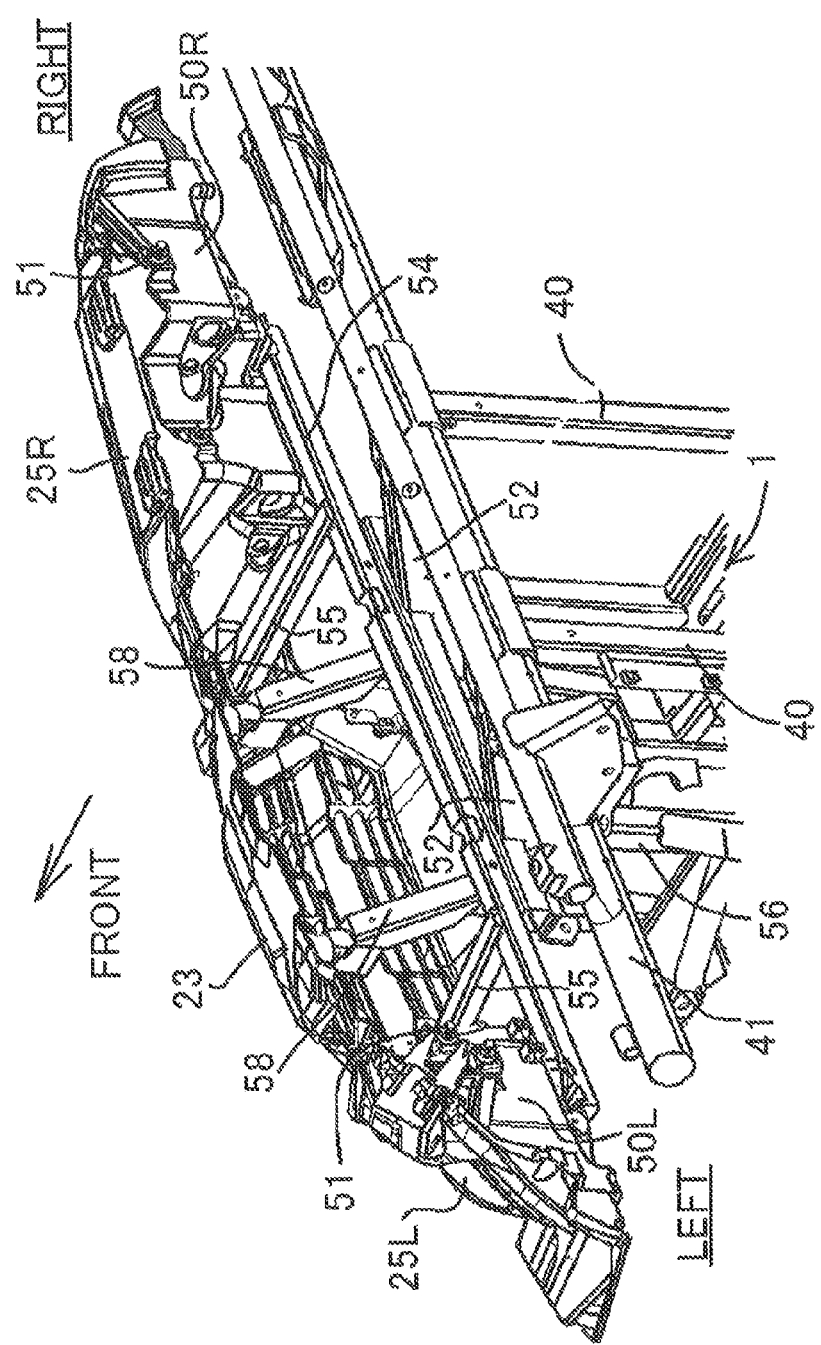
FIG. 6 is a perspective view viewed from above the rear left, of the front grille shown in FIG. 5.

As shown in FIG. 6, the chassis frame 1 is provided with a pair of right and left vertically upright pillars 40 at a front of the chassis frame 1. Upper ends of the pillars 40 are firmly fixed to a cross pipe 41 extending in the vehicle width direction and fixing the cover.

Figure 7:
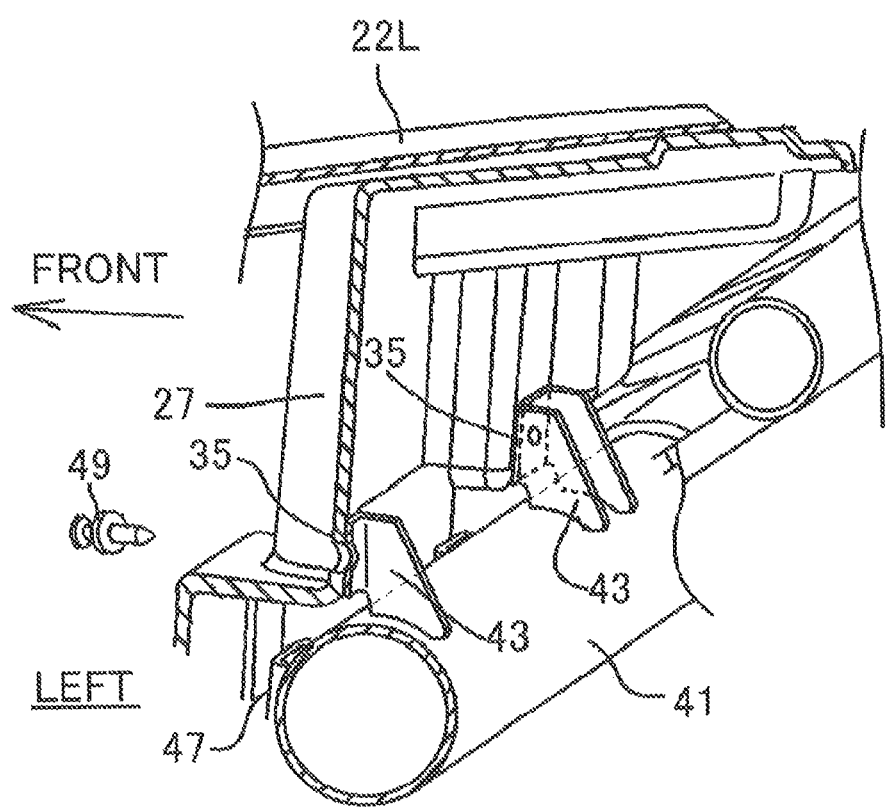
FIG. 7 is a vertical sectional perspective view of a fixing structure at a dashpanel cover of the utility vehicle shown in FIG. 1.

As shown in FIG. 7, four brackets 43 are fixed firmly to an upper surface of the cross pipe 41 firmly fixed to the cross pipe 41 by welding. The four brackets 43 are arranged at intervals in the vehicle width direction. The brackets 43 have front surfaces (attachment surfaces) in contact with the second cover attached portions 35 on the front wall of the dashpanel cover 27. The second attached portions 35 are fixed to the brackets 43 by fasteners such as push rivets 49.

Figure 8:
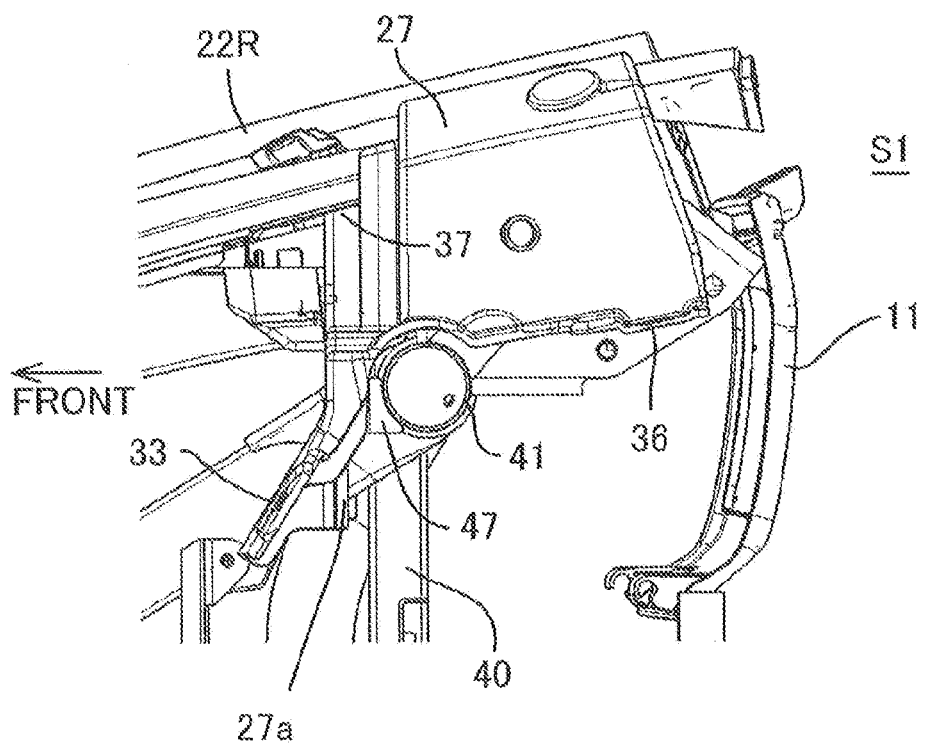
FIG. 8 is a left side view of the dashpanel cover shown in FIG. 7.
Figure 9:
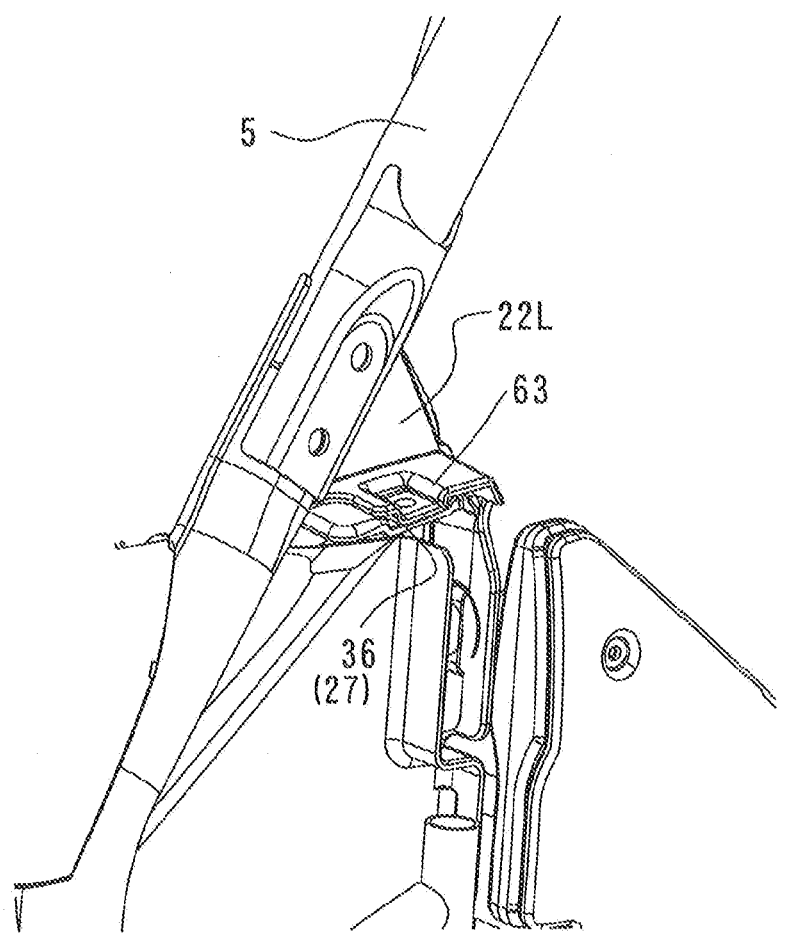
FIG. 9 is a vertical sectional perspective view of a fixing structure at a different part of the dashpanel cover shown in FIG. 7.

As shown in FIG. 8, the dashpanel cover 27 is located such that lower ends of the right and left end walls cross over the cross pipe 41. The extending portion 27a of the dashpanel cover 27 is locked to a bracket 47 that is provided on a front surface of the cross pipe 41. The extending portion 27a of the dashpanel cover 27 may be alternatively fixed to the front surface of the bracket 47 by a fastener.

The structure of the front grille 23 is described in detail below. As shown in FIG. 6, right and left pipes 52 extending forward and downward are fixed firmly to the cross pipe 41 by welding. A support pipe 54 is firmly fixed to lower front ends of the pipes 52 by welding. The support pipe 54 extends in the vehicle width direction, and the front grille 23 (refer to FIG. 4) is fixed firmly to the support pipe 54. The support pipe 54 is also supported by right and left sub pillars 56 extending upward from the chassis frame 1. Right and left first support stays 55 extending forward are firmly fixed to the support pipe 54 by welding. Front ends of the first support stays 55 are fixed to the front grille 23 by fasteners such as push rivets 51. Right and left second support stays 58 extending forward and upward are firmly fixed to a front end of the chassis frame 1 by welding The front grille 23 is also fixed to the front ends of the second support stays 58 by push rivets.

Right and left headlight assemblies 50R and 50L are attached to the rear surfaces of the right and left headlight attachment portions 25R and 25L of the front grille 23 by the plurality of push rivets 51. Lower surfaces of the headlight assemblies 50R and 50L are fixed to upper surfaces at right and left ends of the support pipe 54 by fasteners such as push rivets.

Figure 5:
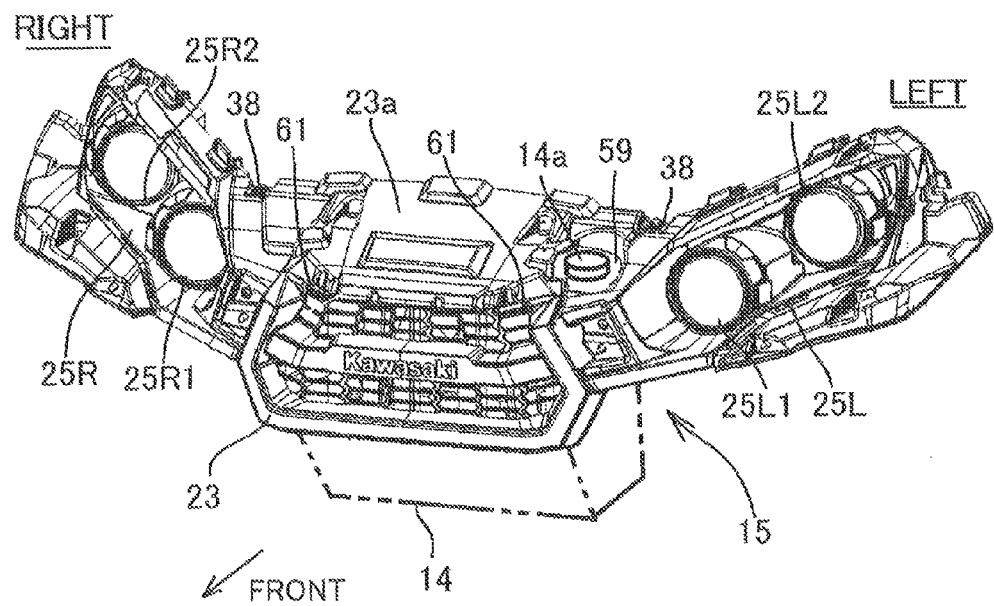
FIG. 5 is a perspective view viewed from above the front left, of a front grille of the utility vehicle shown in FIG. 1.

As shown in FIG. 5, the front grille 23 is integrally provided with an eaves portion 23a at an upper end thereof. The eaves portion 23a extends backward and covers a top of the radiator 14 in the front chamber 15. The eaves portion 23a is provided with an opening 59 at a left end thereof. The opening 59 is located at a position corresponding to a liquid inlet cap 14a of the radiator 14. An operator can reach the liquid inlet cap 14a through the opening 59, to attach and detach the liquid inlet cap 14a. The eaves portion 23a is provided with a pair of right and left third fender attaching seats 38 at a rear end thereof.

The front grille 23 is provided with right and left engagement holes 61 at the right and left upper ends thereof. The engagement holes 61 constitute a part of a first fixing mechanism configured to fix a front end of the hood 26.

The structures of the front fenders 22R and 22L are described in detail below. As shown in FIG. 2, the right side and the left side front fenders 22R and 22L have openings 62 accommodating the headlight attachment portions 25R and 25L of the front grille 23. The right side and the left side front fenders 22R and 22L are integrally provided with first attached portions 63 extending outward in the vehicle width direction. The first attached portions 63 are formed at rear ends of the right side and the left side front fenders 22R and 22L. The first attached portions 63 are connected to the first fender attaching seats 36 of the dashpanel cover 27 by fastener members such as push rivets.

As shown in FIG. 4, the right side front fender 22R is provided with a hood supporting seat 60 that is located at a low position with a stepped portion being interposed therebetween. The hood supporting seat 60 is formed at a left side (at an inner end in the vehicle width direction) of the right side front fender 22R. The hood supporting seat 60 extends along substantially entire length in the front and rear direction of the right side front fender 22R. The hood supporting seat 60 is provided with second and third attached portions 64 and 65. The second attached portion 64 is located near a rear end of the hood supporting seat 60, and the third attached portion 65 is located near a front end of the hood supporting seat 60. The second and third attached portions 64 and 65 each have an attached hole and fix the fender. The second attached portion 64 is fixed to the second fender attaching seat 37 of the dashpanel cover 27 by fastener members such as a push rivet. The third fender attaching seats 38 is fixed to the third fender attaching seats 38 of the front grille 23 by fastener members such as a push rivet.

The hood supporting seat 60 is provided with a projection at the rear end thereof, and the projection is located at a position close to the second attached portion 64 and projects inward (leftward) in the vehicle width direction. The projection is provided with a hood attaching seat 67. The hood attaching seat 67 constitutes a part of a second fixing mechanism to fix the rear end of the hood 26.

The left side front fender 22L shown in FIG. 1 is configured identically with the right side front fender 22R, except that the front fenders 22L and 22R are symmetric in the left-right direction. Accordingly, the left side front fender 22L is not described in detail.

Figure 10:
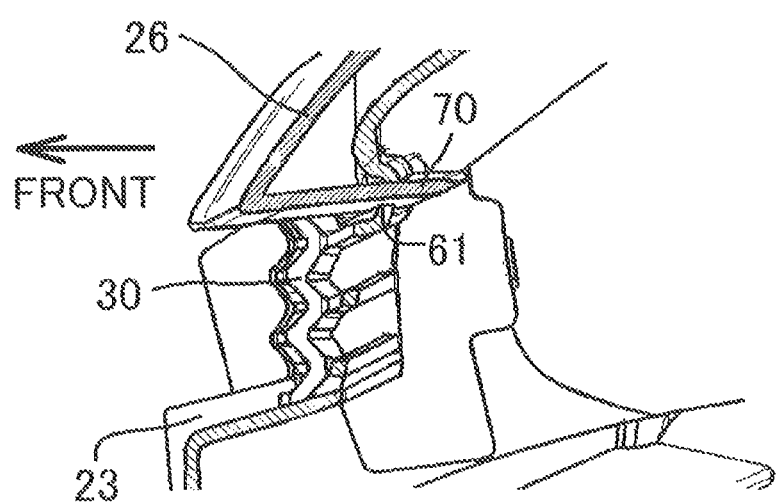
FIG. 10 is an enlarged vertical sectional view of a fixing structure at a front end of the hood shown in FIG. 1.

A fixing structure of the hood 26 is described in detail below. As shown in FIG. 10, the hood 26 is provided with right and left engagement projections 70 at the front end thereof, the engagement projections 70 project backward. The first hood fixing mechanism includes the right and left engagement projections 70 and the right and left hood engagement holes 61 in the front grille 23. When the engagement projections 70 are inserted from the front to the engagement holes 61, the front end of the hood 26 is fixed (engaged) to the front grille 23.

As shown in FIG. 2, the hood 26 is further provided with a pair of right and left latch lock mechanisms 71 at the rear end thereof. The latch lock mechanisms 71 serve as the second hood fixing mechanism and can be locked and unlocked manually.

Figure 11:
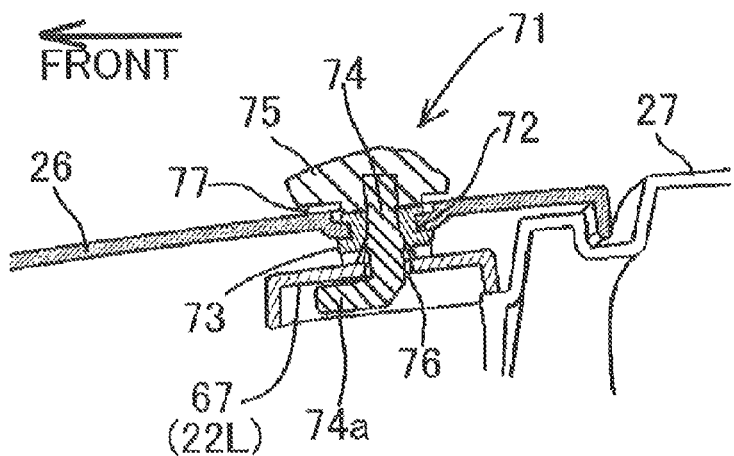
FIG. 11 is an enlarged vertical sectional view of a fixing structure at a rear end of the hood shown in FIG. 1.

As shown in FIG. 11, each of the latch lock mechanisms 71 includes a grommet 73 fitted to a pin supporting hole 72 in the hood 26, a lock pin 74 rotatably fitted to an inner peripheral surface of the grommet 73, a knob 75 firmly fixed to an upper end of the lock pin 74, and a long hole 76 provided in the hood attaching seat 67.

Figure 13:
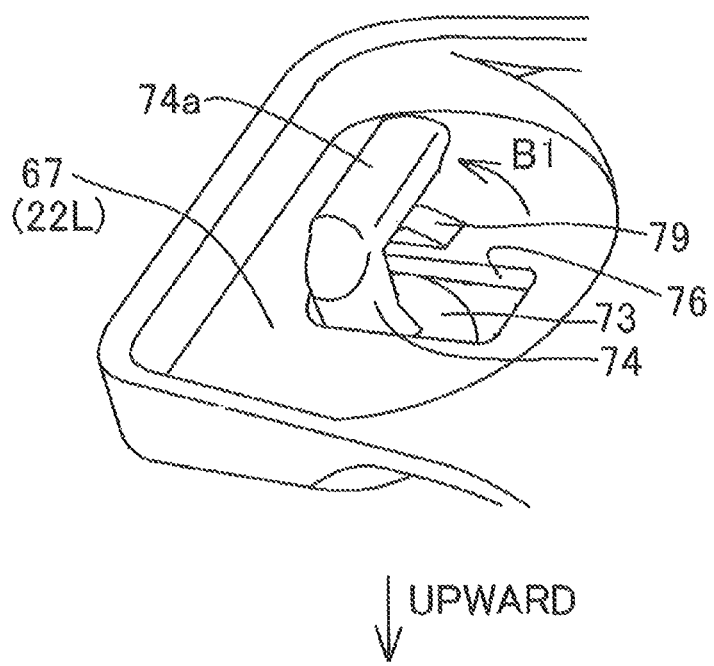
FIG. 13 is a perspective view viewed from below, of the fixing structure at the rear end of the hood shown in FIG. 11.

As shown in FIG. 13, the lock pin 74 is integrally provided with an engagement portion 74a at a lower end thereof. The engagement portion 74a is bent substantially perpendicular to the lock pin 74. The engagement portion 74a can vertically pass through the long hole 76 in a state where the engagement portion 74a is placed along the long hole 76 in the hood attaching seat 67. The hood attaching seat 67 is provided with a reverse preventing projection 79 on a lower surface thereof. The reverse preventing projection 79 is configured to keep the engagement portion 74a of the lock pin 74 at a locked position. The reverse preventing projection 79 is formed in an arcuate shape having gentle slopes. The engagement portion 74a can cross over the reverse preventing projection 79 in a lock direction B1 or in the opposite direction against elastic force of the grommet 73. After crossing over the reverse preventing projection 79 in the lock direction B1, the engagement portion 74a is prevented by the reverse preventing projection 79 from rotating in the opposite direction to the lock direction B1 and is kept at the locked position.

Figure 12:
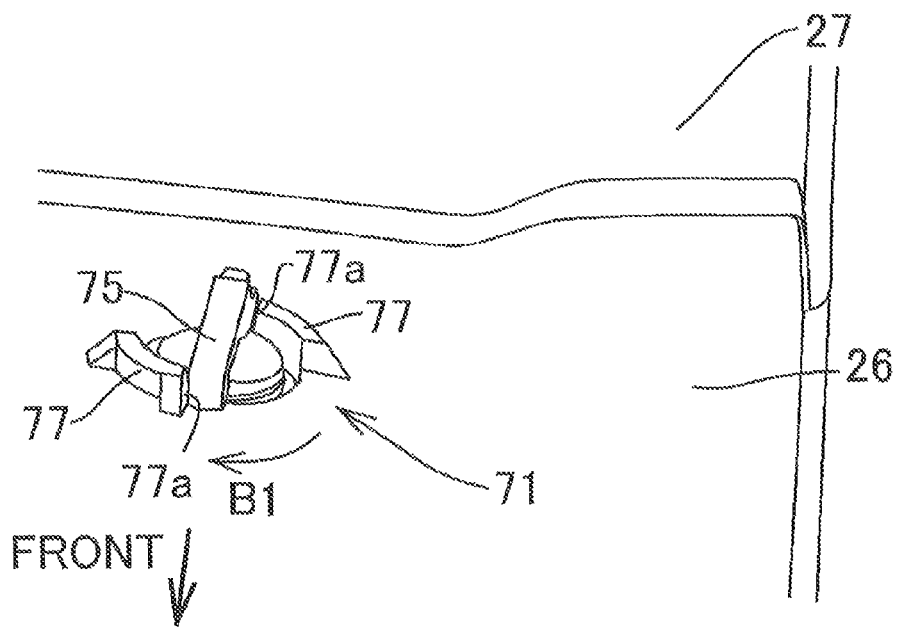
FIG. 12 is a perspective view viewed from front above, of the fixing structure at the rear end of the hood shown in FIG. 11.

As shown in FIG. 12, the hood 26 is provided with a pair of projections 77 configured to regulate rotation of the knob 75 in the lock direction B1 so as to stop the knob 75 at the locked position. The projections 77 project upward from an upper surface of the hood 26 and each has an arc shape when viewed from above, so as to surround the lock pin 74. Each of the projections 77 has a circumferential end serving as a stopper surface 77a. When the knob 75 rotating in the lock direction B1 comes into contact with the stopper surfaces 77a, the knob 75 is locked at the locked position.

As shown in FIG. 10, in order to attach the hood 26, an operator initially inserts the right and left engagement projections 70 of front ends in the hood 26 into the right and left engagement holes 61 in the front grille 23 from the front. Then, as shown in FIG. 11, the engagement portion (latch portion) 74a of the lock pin 74 is subsequently placed to be along the long hole 76 in the hood attaching seat 67. The rear end of the hood 26 is placed on the dashpanel cover 27 and the engagement portion 74a is inserted to the long hole 76. As shown in FIG. 12, the operator grips the knob 75 and rotates the lock pin 74 about its pin axis in the lock direction B1. As shown in FIG. 13, the engagement portion 74a thus crosses over the reverse preventing projection 79 and the knob 75 shown in FIG. 11 comes into contact with the stopper surfaces 77a of the projections 77 to be locked at the locked position. The rear end of the hood 26 is thus locked.

The attaching task or work described above is performed in the inverted order to detach the hood 26. More specifically, the operator grips the knob 75 and rotates the lock pin 74 to the original unlocked position so as to bring the engagement portion 74a into a state of being possibly extracted from the long hole 76. The operator lifts up the rear end of the hood 26 in this state. The operator then moves the hood 26 forward and extracts forward the engagement projections 70 at the front end of the hood 26 shown in FIG. 10 out of the engagement holes 61 in the front grille 23.

The front cover assembly 20 according to the above embodiment has the following advantages.

(a) The left side front fender 22L, the right side front fender 22R, the front grille 23, and the dashpanel cover 27 configuring the front cover assembly 20 are independently manufactured as separate resin members. Therefore, the molding tools or dies for these members can be simplified and manufacture or production of the front cover assembly 20 can be facilitated.

(b) The hood 26 can be independently detached from the other members, namely, the right side and the left side front fenders 22R and 22L, the front grille 23, and the dashpanel cover 27. Therefore, the detached portion can be thus decreased in size and weight, which facilitates the tasks or works of detaching and attaching the hood 26.

(c) The rear end of the left side front fender 22L and the rear end of the right side front fender 22R are connected by the dashpanel cover 27. Therefore, the left side front fender 22L and the right side front fender 22R can be thus increased in rigidity.

(d) The dashpanel cover 27 covering the front of the dashpanel 11 also serves as a member connecting the rear ends of the right side and the left side front fenders 22R and 22L. This configuration reduces the number of components in the front cover assembly 20.

(e) The dashpanel cover 27 is integrally provided with the extending portion 27a extending downward. The extending portion covers the rear tops of the wheel housings 16L and 16R. Therefore, the dashpanel cover 27 can effectively serve as part of the front fender.

(f) The front grille 23 has the eaves portion 23a covering the top of the radiator 14 located in the front chamber 15. Furthermore, the eaves portion 23a has the opening 59 at the position corresponding to the liquid inlet cap 14a of the radiator 14. Therefore, the eaves portion 23a thus protects the radiator 14 from water, mud, and the like falling from above, and facilitates the task or work of supplying liquid into the radiator 14.

(g) The front grille 23 is integrally provided with the headlight attachment portions 25R and 25L at the right and left ends thereof. This configuration improves attachability of the headlight assemblies 50R and 50L.

(h) The front grille 23 is provided integrally with the headlight attachment portions 25L and 25R, and the right and left headlight assemblies 50R and 50L attached to the right and left headlight attachment portions 25R and 25L are fixed to and supported by the support pipe 54 that is provided to the chassis frame 1 and supports the front grille 23. This configuration improves rigidity for supporting the front grille 23.

(f) Engagement between the engagement holes 61 and the engagement projections 70 fixes the front end of the hood 26 to the front grille 23. The rear end of the hood 26 is fixed by the latch lock mechanisms 71 that can be locked and unlocked manually. This configuration allows the hood 26 to be detached easily only by handling the latch lock mechanisms 71, and facilitates inspection of the front chamber 15.

Other Embodiments (1) Alternatively, the first fixing mechanism configured to fix the front end of the hood may include a latch lock mechanism whereas the second fixing mechanism configured to fix the rear end of the hood may include engagement holes and engagement projections.

(2) The hood according to the above embodiment is configured to be detached entirely. The first fixing mechanism including the engagement projections and the engagement holes can be replaced with a hinge. In this configuration, the front chamber can be opened and closed by rotating the hood about the hinge.

(3) According to the above embodiment, all of the right side and the left side front fenders, the front grille, and the dashpanel cover configuring the front cover assembly are made of resin. Alternatively, these members can be entirely or partially made of metal.

(4) The present invention is applicable to a utility vehicle having no rear seat as well as to a utility vehicle having a front seat and/or a rear seat of a bench type.

(5) The present invention is also applicable to a utility vehicle that has a plurality of independent stowable or retractable rear seats, or a bench-type rear seat and a forwardly extendable cargo bed.

(6) The present invention is not limited to the configurations according to the embodiments described above, but can include various modifications devisable within the range not departing from the features recited in the following claims.

What is claimed is:

1. A front cover assembly of a utility vehicle, the front cover assembly comprising:
   a left side front fender;
   a right side front fender provided separately from the left side front fender;
   a front grille provided separately from the left side front fender and the right side front fender, the front grille connecting a front end of the left side front fender and a front end of the right side front fender; and
   a hood provided separately from the left side front fender, the right side front fender, and the front grille, the hood being located between the left side front fender and the right side front fender, and the hood being detachable, or being openable and closeable independently in a condition in which the left side front fender, the right side front fender, and the front grille are attached to a chassis frame of the utility vehicle.

2. The front cover assembly of the utility vehicle according to claim 1, wherein a rear end of the left side front fender and a rear end of the right side front fender are connected by a connecting member.

3. The front cover assembly of the utility vehicle according to claim 2, wherein the connecting member is provided as a cover member covering a front of an interior of a dashpanel provided at a front end of a riding space.

4. The front cover assembly of the utility vehicle according to claim 2, wherein the connecting member has a left end covering a rear of a left wheel housing and a right end covering a rear of a right wheel housing.

5. The front cover assembly of the utility vehicle according to claim 1, wherein the front grille has an eaves portion covering a top of a radiator provided in a front chamber covered with the hood, and the eaves portion has an opening at a position corresponding to a liquid inlet cap of the radiator.

6. The front cover assembly of the utility vehicle according to claim 1, wherein the front grille has right and left ends each provided with a headlight attachment portion.

7. The front cover assembly of the utility vehicle according to claim 2, the front cover assembly further comprising:

a first fixing mechanism configured to fix a front end of the hood to the front grille; and a second fixing mechanism configured to fix a rear end of the hood to the connecting member; wherein one of the first fixing mechanism and the second fixing mechanism includes a concave portion and a projection configured to be inserted to the concave portion, and another one of the first fixing mechanism and the second fixing mechanism includes a latch configured to be locked and unlocked manually.

* * * * *